United States Patent [19]

Lutz

[11] Patent Number: 4,826,926

[45] Date of Patent: May 2, 1989

[54] POLYMER BLEND OF CARBON MONOXIDE/OLEFIN COPOLYMER AND A POLY(2-OXAZOLINE) POLYMER

[75] Inventor: Robert G. Lutz, Santa Rosa, Calif.

[73] Assignee: Shell Oil Company, Houston, Tex.

[21] Appl. No.: 213,411

[22] Filed: Jun. 30, 1988

[51] Int. Cl.$^4$ ............................................. C08G 67/02
[52] U.S. Cl. ................................... 525/412; 525/410; 525/539
[58] Field of Search ....................... 525/412, 410, 539

[56] References Cited

U.S. PATENT DOCUMENTS 2,495,286  1/1950  Brubaker .............................. 260/63

Primary Examiner—Harold D. Anderson
Assistant Examiner—Terressa Marie Mason

[57] ABSTRACT

Blends of (a) a linear alternating polymer of carbon monoxide and at least one ethylenically unsaturated hydrocarbon and (b) a poly(2-oxazoline) polymer exhibit improved processability.

6 Claims, No Drawings

POLYMER BLEND OF CARBON MONOXIDE/OLEFIN COPOLYMER AND A POLY(2-OXAZOLINE) POLYMER

FIELD OF THE INVENTION

This invention relates to an improved polymer blend comprising predominantly a linear alternating polymer of carbon monoxide and at least one ethylenically unsaturated hydrocarbon. More particularly the invention relates to blends of the linear alternating polymer and a poly(2-oxazoline) polymer.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. No. 1,081,304 produced similar polymers in the presence of alkylphosphine complexes of palladium as catalyst. Nozaki extended the reaction to produce linear alternating polymers in the presence of arylphosphine complexes of palladium moieties and certain inert solvents. See, for example, U.S. Pat. No. 3,964,412.

More recently, the class of linear alternating polymers of carbon monoxide and at least one ethylenically unsaturated hydrocarbon, e.g., carbon monoxide and ethylene or carbon monoxide, ethylene and propylene, have become of greater interest in part because of the greater availability of the polymers in quantity. These polymers, often referred to as polyketones or polyketone polymers, have been shown to be of the repeating formula —CO—(A)— wherein A is the moiety of the unsaturated hydrocarbon polymerized through the ethylenic unsaturation. By way of further illustration, when the ethylenically unsaturated hydrocarbon is ethylene, the polymer is represented by the repeating formula —CO—(CH$_2$—CH$_2$)—. The general process for the more recent production of polyketone polymers is shown by a number of Published European patent applications including Nos. 121,965 and 181,014. The process typically involves a catalyst composition formed from a compound of the Group VIII metals palladium, cobalt or nickel, the anion of a strong non-hydrohalogenic acid and a bidentate ligand of phosphorus, arsenic or antimony.

The resulting polyketone polymers are relatively high molecular weight thermoplastics having utility in the production of shaped articles such as containers and automobile parts which are produced by processing the polymer according to known methods such as extrusion or injection molding. For some particular applications it has been found desirable to have properties for a polymeric composition which are somewhat different from the properties of the polyketone polymer. It would be of advantage to retain the desirable properties of the polyketone polymer and yet improve other properties. These advantages are often obtained through the provision of a polymer blend.

SUMMARY OF THE INVENTION

The present invention contemplates the provision of blends of linear alternating polymers of carbon monoxide and at least one ethylenically unsaturated hydrocarbon with other polymeric material. More particularly, according to the present invention, there are provided blends of the linear alternating polymer and poly(2-oxazoline) polymer. Such blends show improved processability.

DESCRIPTION OF THE INVENTION

The polyketone polymers which are employed as the major component of the blends of the invention are linear alternating copolymers of carbon monoxide and at least one ethylenically unsaturated hydrocarbon. Suitable ethylenically unsaturated hydrocarbons for use as the precursor of the polyketone polymers have up to 20 carbon atoms inclusive, preferably up to 10 carbon atoms inclusive, and are aliphatic such as ethylene and other alpha-olefins including propylene, butylene, isobutylene, 1-hexene, 1-octene and 1-dodecene, or are arylaliphatic having an aromatic substituent on a carbon atoms of an otherwise aliphatic molecule, particularly an aromatic substituent on the carbon atom of the ethylenic unsaturation. Illustrative of this latter class of ethylenically unsaturated hydrocarbons are styrene, p-methylstyrene, m-propylstyrene and p-ethylstyrene. Preferred polyketone polymers are copolymers of carbon monoxide and ethylene or terpolymers of carbon monoxide, ethylene and a second hydrocarbon of at least 3 carbon atom, particularly an alpha-olefin such as propylene.

The structure of the polyketone polymer is that of a linear alternating polymer of carbon monoxide and unsaturated hydrocarbon and the polymer will contain substantially one molecule of carbon monoxide for each molecule of unsaturated hydrocarbon. When terpolymers of carbon monoxide, ethylene and a second hydrocarbon are employed, there will be within the terpolymer at least about 2 units incorporating a moiety of ethylene for each unit incorporating a moiety of the second hydrocarbon. Preferably there will be within the terpolymer from about 10 units to about 100 units incorporating a moiety of ethylene for each unit incorporating a moiety of the second hydrocarbon. The polymer chain is therefore represented by the repeating formula

$$-[CO-(CH_2-CH_2)]_x-[CO-(G)]_y-$$

wherein G is the moiety of the second hydrocarbon polymerized through the ethylenic unsaturation. The —CO—(CH$_2$—CH$_2$)— units and the —CO—(G)— units are formed randomly throughout the polymer chain and the ratio of y:x is no more than about 0.5.

In the modification of the invention where copolymer of carbon monoxide and ethylene is employed as the blend component, there will be no second hydrocarbon present and the polymer is represented by the above formula wherein y=0. When y is other than 0, i.e., terpolymers are employed, the ratio of y:x will preferably be from about 0.01 to about 0.1. The end groups or "caps" of the polymer chain will depend upon what materials are present during the production of the polymer and whether and how the polymer has been purified. The precise properties of the polymers will not depend upon the end groups to any considerable extent so that the polymer is farily represented by the above formula for the polymeric chain. Of particular interest are the polyketone polymers of number average molecular weight from about 1,000 to about 200,000, particularly those polymers of number average molecular weight from about 20,000 to about 90,000 as determined by gel permeation chromatography. The physical properties of the polymers will depend in part on the molecular weight, whether the polymer is a copolymer or a terpolymer and the relative proportion of the second hydrocarbon present in the case of terpolymers. Typical melting points of the polyketone polymers are from about 175° C. to about 300° C., more frequently from about 210° C. to about 270° C. The polymers will have a limiting viscosity number (LVN), when measured in a standard capillary viscosity measuring device at 60° C. in m-cresol, of from about 0.5 to about 10 but preferably from about 0.8 to about 4.

A method of producing the polymers which is now becoming conventional is to contact the carbon monoxide and the unsaturated hydrocarbon(s) in the presence of a catalyst composition formed from a palladium compound, the anion of a non-hydrohalogenic acid having a pKa below about 6 and a bidentate phosphorus ligand. The scope of polyketone polymer production is extensive but, without wishing to be limited, a preferred palladium compound is a palladium carboxylate, particularly palladium acetate, a preferred anion is the anion of p-toluenesulfonic acid or trifluoroacetic acid and a preferred bidentate phosphorus ligand is 1,3-bis(diphenylphosphino)propane or 1,3-bis[di(2-methoxyphenyl)phosphino]propane. Such a process is illustrated by copending U.S. patent application Ser. No. 930,468, filed Nov. 14, 1986 (Docket No. K-0722).

Polymerization is conducted in the gas phase in the substantial absence of diluent or in a liquid phase in the presence of an inert diluent such as an alkanol, e.g., methanol or ethanol. The reactants are contacted by conventional methods such as shaking or stirring in a reaction vessel. Suitable reaction temperatures are from about 20° C. to about 150° C., preferably from about 50° C. to about 135° C. Typical reaction pressures are from about 1 bar to about 200 bar, more typically from about 1 bar to about 100 bar. Subsequent to reaction the polymer is recovered by conventional procedures such as filtration or decantation. The polymer may contain residues of the catalyst composition which are removed, if desired, by treatment with a solvent or a complexing agent which is selective for the residues.

The minor component of the blends of the invention is a poly(2-oxazoline) polymer, which polymer is typically obtained by ring opening polymerization of a 2-oxazoline having a substituent in the 2 position. Such 2-oxazolines are represented by the formula

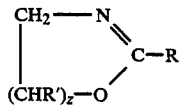

wherein R is hydrogen, alkyl or phenyl of up to 18 carbon atoms, or an inertly-substituted derivative thereof; R' is hydrogen or a $C_1$–$C_3$ alkyl; and z is 1 or 2. By such terms as "inertly-substituted" is meant that the substituents do not preclude the polymerization of the 2-oxazoline monomers. Illustrative inert substituents include halogen, alkenyl hydrocarbons, alkoxy, ester, etc. Exemplary R' substituents include hydrogen, methyl, ethyl and propyl and exemplary R substituents include hydrogen, methyl, ethyl, propyl, pentyl, cyclohexyl, dodecyl, octadecyl, and the various halogenated, ethylenically unsaturated, etc., derivatives of each such as poly(2-trichloromethyl-2-oxazoline), poly(2-isopropenyl-2-oxazoline), etc.

The ring opening polymerization takes place in a liquid phase in the presence of an inert liquid reaction diluent, for example, diethyl ether, and in the presence of a cationic polymerization agent. Suitable polymerization agents include strong mineral acids such as hydrochloric acid or sulfuric acid, organic acid such as p-toluenesulfonic acid and Lewis acids such as boron trifluoride, aluminum chloride and stannic chloride. The resulting polymer initially obtained by the ring-opening polymerization is of the repeating formula

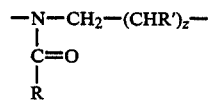

wherein R, R', and z have the previously stated meaning. Such poly(2-oxazoline) polymers are satisfactory as components of the blends of the invention. In a second embodiment, the poly(2-oxazoline) polymer is partially hydrolyzed to remove some but not all of the N-acyl groups present in the polymer molecule. Such hydrolysis is easily accomplished by contacting the poly(2-oxazoline) polymer initially produced with a limited amount of aqueous strong acid, e.g., aqueous hydrochloric acid, followed by treatment with a base such as sodium hydroxide. The partially hydrolyzed polymers produced by hydrolysis of a portion of the N-acyl groups of the poly(2-oxazoline) polymer is represented by the following random repeating formula

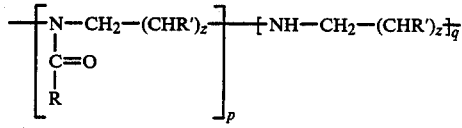

wherein p represents the number of acylated (non-hydrolyzed) units, q represents the number of hydrolyzed units and R, R' and z have the previously stated significance. The term poly(2-oxazoline) polymer is used to include the polymer of this latter formula wherein the proportion of q units is from 0% to about 50%. The poly(2-oxazoline) polymers typically have a molecular weight of from about 1,000 to about 1,000,000, but best results are obtained in the blends of the invention if the poly(2-oxazoline) polymer is of a molecular weight from about 20,000 to about 100,000. Preferably, the poly(2-oxazoline) is poly(2-ethyl-2-oxazoline) and partially hydrolyzed poly(2-ethyl-2-oxazoline).

Such poly(2-oxazoline) polymers are known in the art as are the methods for the production of such polymers. Certain of the poly(2-oxazoline) polymers such as poly(2-ethyl-2-oxazoline) are commercially available from Dow. A more comprehensive description of polymer production as well as the resulting polymers is disclosed by Hoenig et al, U.S. Pat. No. 4,474,928 and Jones et al, U.S. Pat. No. 3,640,909.

The blends of the invention comprise a mixture of a major proportion of polyketone polymer and a minor proportion of poly(2-oxazoline) polymer. The precise proportion of the poly(2-oxazoline) polymer is not critical and quantities of poly(2-oxazoline) polymer from about 0.5% by weight to about 30% by weight, based on total blend, are satisfactory. Preferred quantities of poly(2-oxazoline) polymer from about 1% by weight to about 20% by weight on the same basis are preferred. The method of producing the blend is not material so long as a relatively uniform distribution of the poly(2-oxazoline) polymer throughout the polyketone polymer is obtained. The polyketone polymer/poly(2-oxazoline) polymer is a non-miscible blend with the poly(2-oxazoline) polymer existing as a discrete phase in the polyketone matrix having a phase size of from about 0.6 micron to about 2 microns, but more typically on the order of 1.3 micron. The blend will not, therefore, be homogeneous but good properties are obtained when the distribution of the poly(2-oxazoline) polymer is substantially uniform throughout the polyketone polymer matrox. The method of blending the components is that which is conventional for non-miscible polymeric materials. In one modification, the components in particulate form are mixed and passed through an extruder to produce the blend as an extrudate. In an alternate modification, the components are blended in a mixing device which exhibits high shear.

The blends of the invention may also include conventional additives such as antioxidants, stabilizers, fillers, fire retardant materials, mold release agents and other materials which are added to increase the processability of the polymers or to improve the properties of the resulting blend. Such additives are incorporated by conventional methods prior to, together with or subsequent to the blending of the polyketone polymer and the poly(2-oxazoline) polymer components.

The blends of the invention are characterized by improved processability. The blends are processed by known methods such as extrusion and injection molding into sheets, films, fibers, plates and shaped articles useful in packaging applications as well as in the production of containers for food and drink.

The invention is further illustrated by the following illustrative embodiments which should not be construed as limiting.

ILLUSTRATIVE EMBODIMENT I

A terpolymer of carbon monoxide, ethylene and propylene was produced in the presence of a catalyst composition formed from palladium acetate, the anion of p-toluenesulfonic acid and 1,3-bis(diphenylphosphino)propane. The terpolymer had a melting point of 221° C. and an LVN measured in m-cresol at 60° C. of 1.48.

ILLUSTRATIVE EMBODIMENT II

A blend of the polyketone polymer of Illustrative Embodiment I and 9.3% by weight of a poly(2-ethyl-2-oxazoline) polymer (Dow polymer sample XA-10874.01) having a glass transition temperature (Tg) of 59° C. was produced by passing a mixture of the polymeric components through a 15 mm twin screw Baker Perkins extruder. The extruder operated at 240° C. under a nitrogen blanket at maximum torque and RPM. Undried feed was used and the extruded strand was passed directly into water. A cold cut sample of the blend was examined under an electron microscope after staining of the sample with ruthenium tetroxide. The poly(2-oxazoline) polymer appeared to be present as a discrete phase of a phase size of about 1.3 micron, although certain of the cells seemed to fade during the cut. The Tg of the blend was 81° C.

The blended polymer exhibited slightly improved extruder feed rate (130%) relative to the unblended polyketone control polymer. No melt degradation of the blended polymer was visible after extrusion. The color of the blended polymer was as good as the polyketone control or slightly better after oven aging.

What is claimed is:

1. A composition comprising a non-miscible blend of, as a major component, a linear alternating polymer of carbon dioxide and at least one ethylenically unsaturated hydrocarbon and, as a minor component, a poly(2-oxazoline) polymer.

2. The composition of claim 1 wherein the linear alternating polymer is represented by the repeating formula

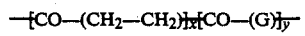

wherein G is the moiety of an ethylenically unsaturated hydrocarbon of at least 3 carbon atoms polymerized through the ethylenic unsaturation and the ratio of y:x is no more than about 0.5.

3. The composition of claim 2 wherein the poly(2-oxazoline) polymer is represented by the following repeating formula

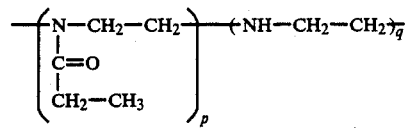

wherein the percentage of q units is from 0% to about 50%.

4. The composition of claim 3 wherein the quatity of poly(2-oxazoline) polymer is from about 0.5% by weight to about 30% by weight, based on total blend.

5. The composition of claim 4 wherein y=0.

6. The composition of claim 5 wherein G is a moiety of propylene and the ratio of y:x is from about 0.01 to about 0.1.

* * * * *